(12) United States Patent
Park et al.

(10) Patent No.: US 10,796,007 B2
(45) Date of Patent: Oct. 6, 2020

(54) METHOD FOR OPERATING SEMICONDUCTOR DEVICE, CAPABLE OF DUMPING A MEMORY WITH SECURITY

(71) Applicant: SAMSUNG ELECTRONICS CO., LTD., Suwon-si (KR)

(72) Inventors: Keun Young Park, Seongnam-si (KR); Ji Hyun Kim, Hwaseong-si (KR); Dong Jin Park, Seoul (KR); Yoon Jick Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 331 days.

(21) Appl. No.: 15/784,548

(22) Filed: Oct. 16, 2017

(65) Prior Publication Data

US 2018/0196949 A1    Jul. 12, 2018

(30) Foreign Application Priority Data

Jan. 9, 2017    (KR) ........................ 10-2017-0002781

(51) Int. Cl.

| | |
|---|---|
| *G06F 11/00* | (2006.01) |
| *G06F 21/60* | (2013.01) |
| *H04L 9/08* | (2006.01) |
| *H04L 9/14* | (2006.01) |
| *G06F 11/07* | (2006.01) |
| *G06F 9/4401* | (2018.01) |
| *H04L 9/30* | (2006.01) |
| *G06F 21/79* | (2013.01) |
| *G06F 21/57* | (2013.01) |

(52) U.S. Cl.
CPC .......... *G06F 21/602* (2013.01); *G06F 9/4406* (2013.01); *G06F 11/073* (2013.01); *G06F 11/0778* (2013.01); *G06F 21/577* (2013.01); *G06F 21/79* (2013.01); *H04L 9/0869* (2013.01); *H04L 9/14* (2013.01); *H04L 9/30* (2013.01)

(58) Field of Classification Search
CPC .................................................. G06F 11/0778
See application file for complete search history.

(56) References Cited

U.S. PATENT DOCUMENTS

| | | | |
|---|---|---|---|
| 6,427,202 B1 * | 7/2002 | Richardson | ......... G06F 9/30145 |
| | | | 712/248 |
| 6,839,837 B1 | 1/2005 | Morishita | |
| 7,921,303 B2 * | 4/2011 | Mauro, II | ............... G06F 21/79 |
| | | | 713/193 |
| 8,453,015 B2 | 5/2013 | Ponnuswamy | |
| 8,489,933 B2 | 7/2013 | Yoshida et al. | |
| 8,543,839 B2 * | 9/2013 | Sibert | ................... G06F 21/572 |
| | | | 705/51 |
| 8,621,282 B1 | 12/2013 | Mixter et al. | |
| 8,644,499 B2 | 2/2014 | Kothari et al. | |
| 8,707,305 B2 * | 4/2014 | Hendel | ............... G06F 9/45533 |
| | | | 714/38.11 |

(Continued)

*Primary Examiner* — Jonathan D Gibson
(74) *Attorney, Agent, or Firm* — Sughrue Mion, PLLC

(57) ABSTRACT

Provided is a method of operating a semiconductor device. A method of operating a semiconductor device includes storing secure data in a secure area of a memory in response to detecting a system failure; encrypting the secure data stored in the secure area by using a random key to generate encrypted secure data; storing the encrypted secure data in the secure area; and dumping the secure area and a non-secure area of the memory.

16 Claims, 14 Drawing Sheets

(56) References Cited

U.S. PATENT DOCUMENTS

| | | | |
|---|---|---|---|
| 9,286,152 B2 | 3/2016 | Semenko et al. | |
| 2009/0271620 A1* | 10/2009 | Sudhakar | H04L 63/0823 |
| | | | 713/164 |
| 2011/0208975 A1* | 8/2011 | Sibert | G06F 8/65 |
| | | | 713/189 |
| 2013/0282951 A1* | 10/2013 | Kuo | G06F 21/575 |
| | | | 711/102 |
| 2016/0125188 A1* | 5/2016 | Hall | G06F 21/62 |
| | | | 713/164 |
| 2017/0220443 A1* | 8/2017 | Broutin | G06F 11/0778 |
| 2017/0257222 A1* | 9/2017 | Pedersen | G06F 21/70 |

* cited by examiner

METHOD FOR OPERATING SEMICONDUCTOR DEVICE, CAPABLE OF DUMPING A MEMORY WITH SECURITY

CROSS-REFERENCE TO THE RELATED APPLICATION

This application claims priority from Korean Patent Application No. 10-2017-0002781, filed on Jan. 9, 2017, in the Korean Intellectual Property Office, the disclosure of which is incorporated herein in its entirety by reference.

BACKGROUND

1. Technical Field

Methods consistent with example embodiments relate to a method for operating a semiconductor device.

2. Description of the Related Art

When a failure occurs during operation of a semiconductor device or system, information stored in a memory may be used to identify the cause of the failure and perform debugging. In order to acquire such information, a ramdump technique is used to extract the data stored in the memory as it is.

However, the memory may store both secure data and non-secure data. In the event of a failure, the system may allow a third party to perform a ramdump on the non-secure data, but the system may not allow an unauthorized third party to perform a ramdump on the secure data containing, for example, personal information. Nonetheless, there may be a situation where it is desirable to analyze the secure data by performing a ramdump on the secure data in order to determine the exact cause of the failure.

Therefore, it is desirable to perform a ramdump on both the secure data and the non-secure data while providing the secure data only to an authorized person to maintain security stability.

SUMMARY

One or more example embodiments provide a method for operating a semiconductor device, capable of performing a ramdump on data including secure data while maintaining security stability.

One or more example embodiments also provide a method for operating a semiconductor device, capable of performing a simple and stable ramdump without using additional resources.

However, aspects of the disclosure are not restricted to the one set forth herein. The above and other aspects of the disclosure will become more apparent to one of ordinary skill in the art to which the disclosure pertains by referencing the detailed description of the disclosure given below.

According to an aspect of an example embodiment, there is provided a method of operating a semiconductor device including storing secure data in a secure area of a memory in response to detecting a system failure; encrypting the secure data stored in the secure area by using a random key newly generated after booting to generate encrypted secure data; storing the encrypted secure data in the secure area; and dumping the secure area and a non-secure area of the memory.

According to another aspect of an example embodiment, there is provided a method of operating a semiconductor device including checking a one-time programmable (OTP) disable bit in response to detecting a system failure; in response to the OTP disable bit being disabled, storing secure data in a secure area of a memory, the memory including the secure area and a non-secure area; encrypting the secure data stored in the secure area by using a random key newly generated after booting to generate encrypted secure data; storing the encrypted secure data in the secure area; setting the secure area as the non-secure area; and dumping the memory; and in response to the OTP disable bit being enabled, maintaining the secure area of the memory and dumping the memory.

According to still another aspect of an example embodiment, there is provided a method of operating a semiconductor device including loading a secure ramdump agent to a secure area of a memory, the memory including the secure area and a non-secure area; loading a diagnostic and ramdump component to the non-secure area of the memory; monitoring, by the diagnostic and ramdump component, whether a system failure is detected; storing, by the secure ramdump agent, secure data in the secure area, in response to detecting the system failure by the diagnostic and ramdump component; encrypting, by the secure ramdump agent, the secure data stored in the secure area by using a random key newly generated after booting to generate encrypted secure data; storing, by the secure ramdump agent, the encrypted secure data in the secure area; setting, by the secure ramdump agent, the secure area as a non-secure area; and dumping the memory.

According to still another aspect of an example embodiment, there is provided a method of operating a semiconductor device including encrypting secure data stored in a memory by using a random key, in response to detecting a system failure; storing encrypted secure data in the memory; and dumping the memory including the secure data.

According to still another aspect of an example embodiment, there is provided a method of operating a semiconductor device including enabling a one-time programmable (OTP) disable bit to prevent a secure area of a memory from being dumped in response to detecting a system failure; and disabling the OTP disable bit to allow the secure area of the memory to change to a non-secure area and to be dumped in response to detecting the system failure, wherein secure data stored in the secure area is encrypted by using a random key and overwritten to the secure area before the secure area is changed to the non-secure area and dumped in response to detecting the system failure.

BRIEF DESCRIPTION OF THE DRAWINGS

The above and other aspects and features of the disclosure will become more apparent by describing in detail example embodiments with reference to the attached drawings, in which.

DETAILED DESCRIPTION

Below, example embodiments will be described in detail.

Figure 1:
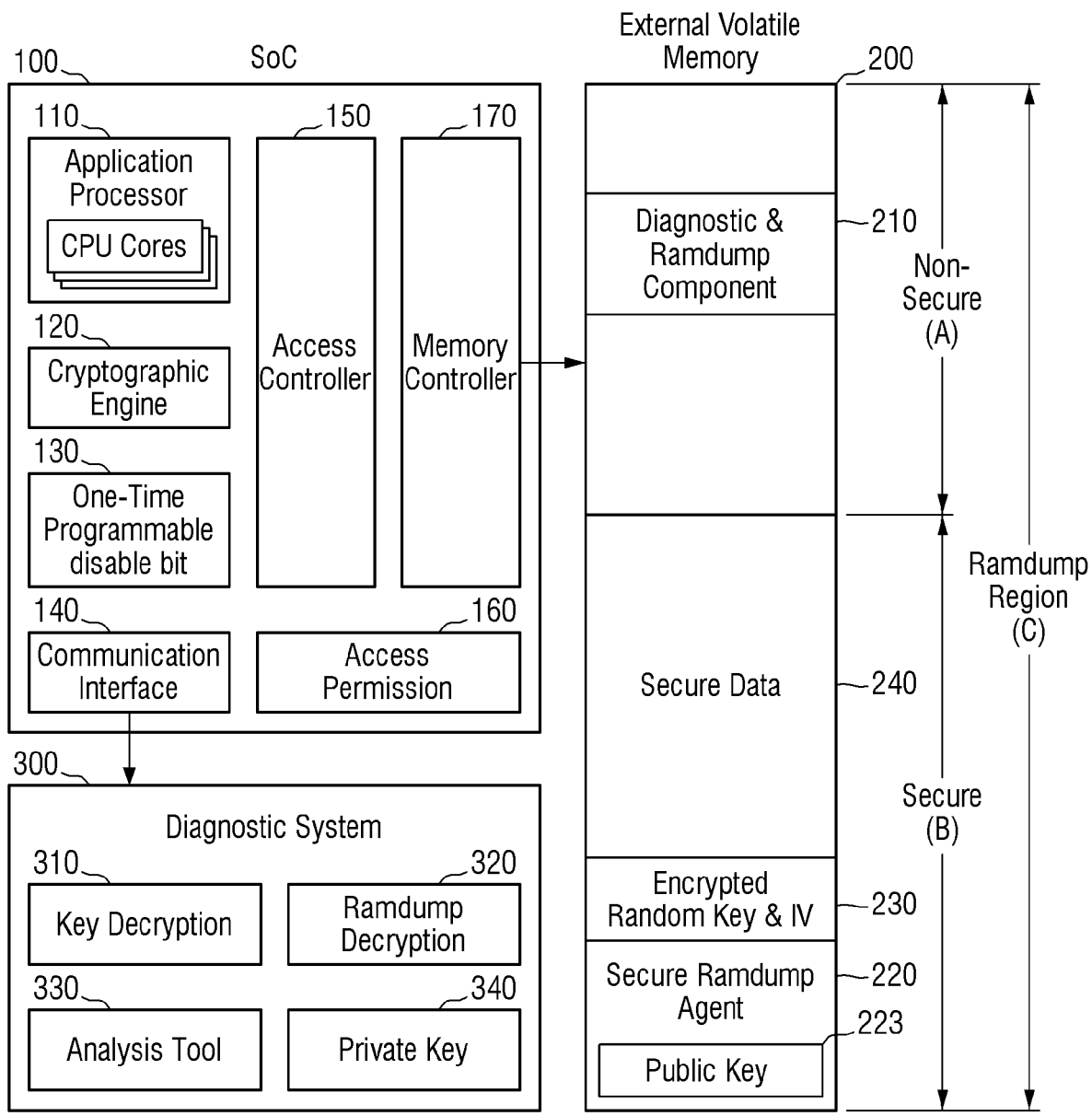
FIG. 1 is a schematic diagram illustrating a semiconductor system using a semiconductor device according to an example embodiment.

FIG. 1 is a schematic diagram illustrating a semiconductor system using a semiconductor device according to an example embodiment.

Referring to FIG. 1, a semiconductor system using a semiconductor device according to an example embodiment includes a system-on-chip 100, an external memory 200, and a diagnostic system 300.

The system-on-chip 100 according to an example embodiment includes an application processor 110, a cryptographic engine 120, a one-time programmable (OTP) disable bit 130, a communication interface 140, an access controller 150, an access permission manager 160 and a memory controller 170. However, it is apparent to those skilled in the art that the configuration of the system-on-chip 100 shown in FIG. 1 is merely an example and a detailed configuration thereof may be modified in various ways depending on the purpose of implementation.

The application processor 110 may process the overall operations of the system-on-chip 100 and may include a plurality of central processing unit (CPU) cores. The cryptographic engine 120 may be used to encrypt secure data 240 in the external memory 200, which will be described in detail later. The OTP disable bit 130 is used to prevent a ramdump from being performed on a secure area B of the external memory 200. The communication interface 140 enables the system-on-chip 100 to exchange data with the diagnostic system 300. The access controller 150 and the access permission manager 160 allow for a change between secure and non-secure states when performing a ramdump on the external memory 200, which will be described in detail with reference to FIG. 2. The memory controller 170 controls the external memory 200.

The external memory 200 includes a non-secure area A and the secure area B. In various example embodiments, when a failure occurs in the semiconductor system and a ramdump is performed, a ramdump region C, on which a ramdump is to be performed, includes not only the non-secure area A but also the secure area B.

A diagnostic and ramdump component 210 may be loaded onto the non-secure area A. Various data having no security concerns may be loaded onto the remaining area of the non-secured area A. The diagnostic and ramdump component 210 will be described in detail with reference to FIG. 2.

A secure ramdump agent 220, an encrypted random key 230, and the secure data 240 may be loaded onto the secure area B. The encryption random key 230 may include an initial vector for encryption. The secure data 240 includes a user's personal information or various data that must be kept secure on the system. For example, the secure data 240 may include codes or data relating to secure software, execution information regarding secure hardware, and the like. The secure ramdump agent 220 and the encrypted random key 230 will be described in detail with reference to FIG. 2.

In some example embodiments, the external memory 200 may be implemented as a volatile memory, for example, a dynamic random access memory (DRAM), but the scope is not limited thereto.

When a failure occurs in the system, for example, when a system failure occurs, the diagnostic system 300 receives a ramdump history for the external memory 200 and analyzes the contents thereof. The diagnostic system 300 includes a key decryption unit 310, a ramdump decryption unit 320 and a private key 340, which are used to decrypt the encrypted ramdump history for the secure area B of the external memory 200, and an analysis tool 330, which is used to analyze the cause of the failure from the decrypted ramdump history. The key decryption unit 310, the ramdump decryption unit 320 and the private key 340 will be described with reference to FIG. 7.

Figure 2:
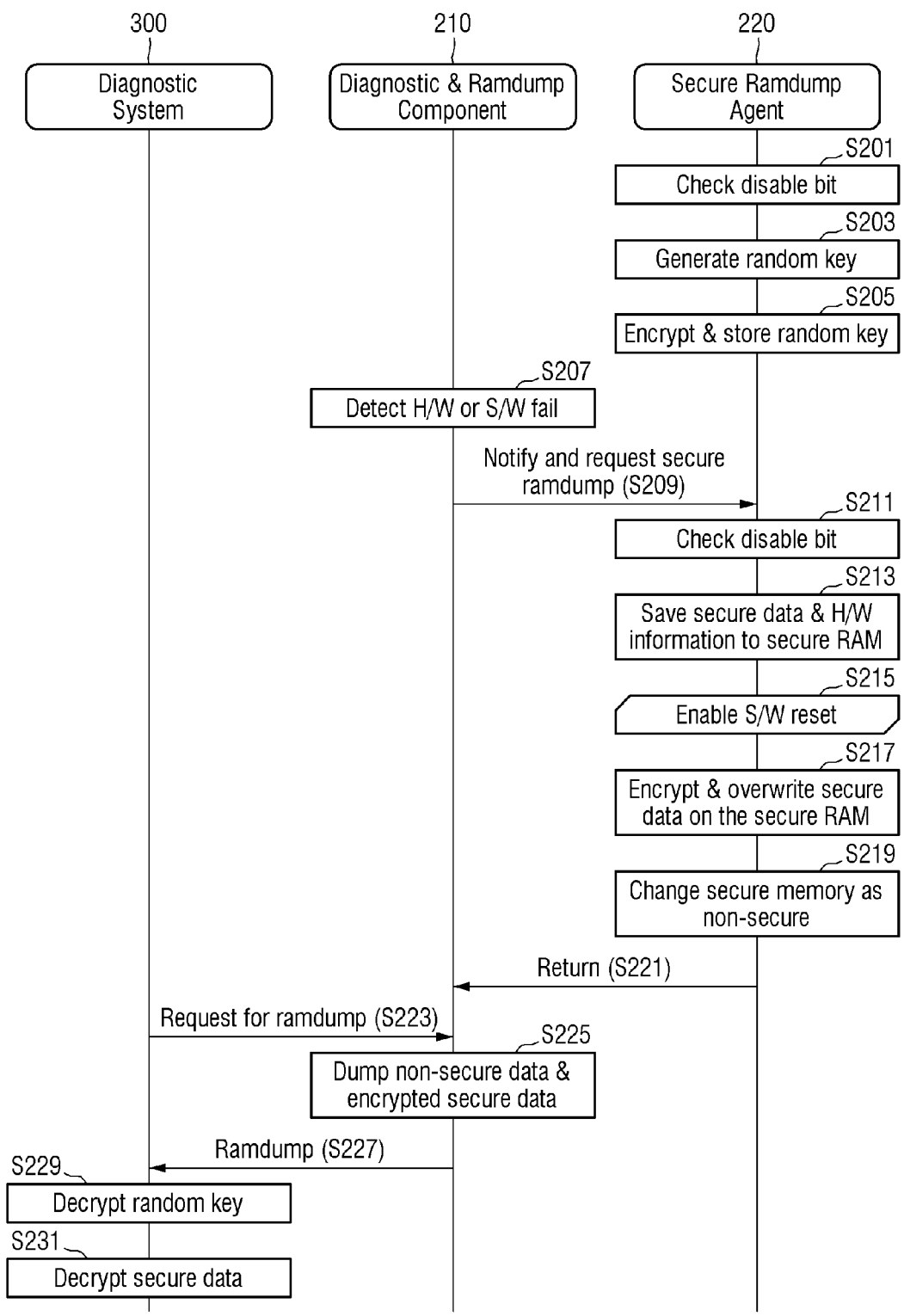
FIG. 2 is a flowchart illustrating an operation of a semiconductor system using a semiconductor device according to an example embodiment.

FIG. 2 is a flowchart illustrating an operation of a semiconductor system using a semiconductor device according to an example embodiment.

Referring to FIG. 2, the secure ramdump agent 220 checks the OTP disable bit 130 at a system boot, that is, the time of booting the system (S201).

If the OTP disable bit 130 is disabled, the secure ramdump agent 220 generates a random key 221 (S203). The random key is used to encrypt the secure data 240 of the external memory 200.

The secure ramdump agent 220 encrypts the generated random key 221 and stores the encrypted random key 230 in the secure area B of the external memory 200 (S205). The encrypted random key 230 stored in the secure area B can be used to encrypt the secure data 240 of the external memory 200 when a system failure occurs in the future.

In some example embodiments, the secure ramdump agent 220 may encrypt the random key 221 using a public key 223 generated in advance. The public key 223 may be stored in an area occupied by the secure ramdump agent 220 in the secure area B of the external memory 200. The private key 340 paired with the public key 223 may be stored in the diagnostic system 300.

In some example embodiments, the secure ramdump agent 220 may newly generate the random key 221 each time the system is booted, thereby increasing the security level.

On the other hand, in operation S201, if the OTP disable bit is enabled, the secure ramdump agent 220 does not perform the above operations S203 and S205.

Then, the diagnostic and ramdump component 210 monitors whether a system failure has occurred. If the occurrence of a system failure is detected (S207), the diagnostic and ramdump component 210 notifies the secure ramdump agent 220 of the occurrence of a system failure and transmits a request to perform a ramdump on the external memory 200 (S209).

In response to receiving the notification and the request from the diagnostic and ramdump component 210, the secure ramdump agent 220 checks the OTP disable bit 130 (S211).

If the OTP disable bit is disabled, the secure ramdump agent 220 stores the secure data 240 in the secure area B of the external memory 200 (S213).

In some example embodiments, storing the secure data 240 in the secure area B may further comprise storing hardware information in the secure area B.

Next, the secure ramdump agent 220 may enable a software reset (S215) to initialize other hardware (e.g., the cryptographic engine 120, the communication interface 140, etc.) that may cause a system failure while preserving the data on the external memory 200 as it is. However, operation S215 may be omitted depending on example embodiments.

Next, the secure ramdump agent 220 encrypts the secure data 240 stored in the secure area B using the random key 221 generated in operation S203, and stores the encrypted secure data 250 (refer to FIG. 5B) again in the secure area B (S217).

It should be noted that although it is illustrated in FIG. 2 that the secure ramdump agent 220 generates the random key 221 at the time of booting the system in operation S203, and then, when the occurrence of a system failure is detected in operation S207, encryption is performed using the random key 221, the scope of the disclosure is not limited to the illustrated sequence of the generation of the random key 221 and the detection of the occurrence of the system failure.

That is, in some other example embodiments, the diagnostic and ramdump component 210 may monitor whether a system failure has occurred and detect the occurrence of a system failure (S207). Then, the secure ramdump agent 220 checks the OTP disable bit 130 (S211), and if the OTP disable bit 130 is disabled in operation S211, the secure ramdump agent 220 may generate the random key 221. Further, in operation S211, the secure ramdump agent 220 may encrypt the generated random key 221 and store the encrypted random key 230 in the secure area B of the external memory 200.

That is, according to some example embodiments, the random key 230 may be newly generated at or after booting the semiconductor system. Also, according to some example embodiments, the random key 230 may be newly generated at the time of booting, or in response to detecting the occurrence of a system failure.

In some example embodiments, storing the encrypted secure data 250 in the secure area B may comprise overwriting the encrypted secure data 250 at the same position as the position at which the secure data 240 has been stored on the external memory 200.

Next, the secure ramdump agent 220 sets the secure area B of the external memory 200 as a non-secure area (S219), so that a ramdump can be performed on the secure area B.

In an example embodiment, the random key 221 stored in the external memory 200 is deleted after the encrypted secure data 250 is overwritten and before the secure ramdump agent 220 sets the secure area B of the external memory 200 as a non-secure area. Accordingly, even if the secure ramdump agent 220 sets the secure area B of the external memory 200 as a non-secure area in operation S219, the random key 221 is not exposed in a non-secure state.

The secure ramdump agent 220 performs the above operations S213 to S219 and returns to the diagnostic and ramdump component 210 (S221).

On the other hand, if the OTP disable bit is enabled in operation S211, the secure ramdump agent 220 returns to the diagnostic and ramdump component 210 (S221) without performing operations S213 to S219. This case corresponds to a case where a ramdump is prevented from being performed on the secure area B, and in the ramdump result, a portion corresponding to the secure area B is filled with meaningless values.

After the secure ramdump agent 220 returns to the diagnostic and ramdump component 210, the diagnostic system 300 sends a ramdump request to the diagnostic and ramdump component 210 (S223). In response to the ramdump request, the diagnostic and ramdump component 210 dumps data 208 corresponding to the non-secure area A and the encrypted secure data 250 corresponding to the secure area B (S225), and transmits the result to the diagnostic system 300 (S227).

Next, in the diagnostic system 300, the key decryption unit 310 decrypts the encrypted random key 230 using the private key 340 (S229) and the ramdump decryption unit 320 decrypts the encrypted secure data 250 using the decrypted random key 221 (S231). Accordingly, the diagnostic system 300 can analyze the information about the secure area B of the external memory 200 using the analysis tool 330 to determine the cause of the system failure.

According to an example embodiment, after the secure data 240 is encrypted, the encrypted secure data 250 is overwritten at the same position on the external memory 200. Thus, there is no need for an additional storage space for storing the encrypted secure data 250. Further, in the event of a system failure, it is possible to dump the data of not only the non-secure area A but also the secure area B. If data of the secure area B is not to be dumped, it is possible to easily maintain the security by preventing the dump on the secure area B using the OTP disable bit 130. In addition, since the secure data 240 is encrypted using the random key 221 newly generated at each boot time, the security level can be enhanced.

FIGS. 3A to 3D are diagrams illustrating an example of a method for operating a semiconductor device according to an example embodiment. FIGS. 3A to 3D are based on the assumption that the OTP disable bit 130 is disabled.

Figure 3A:
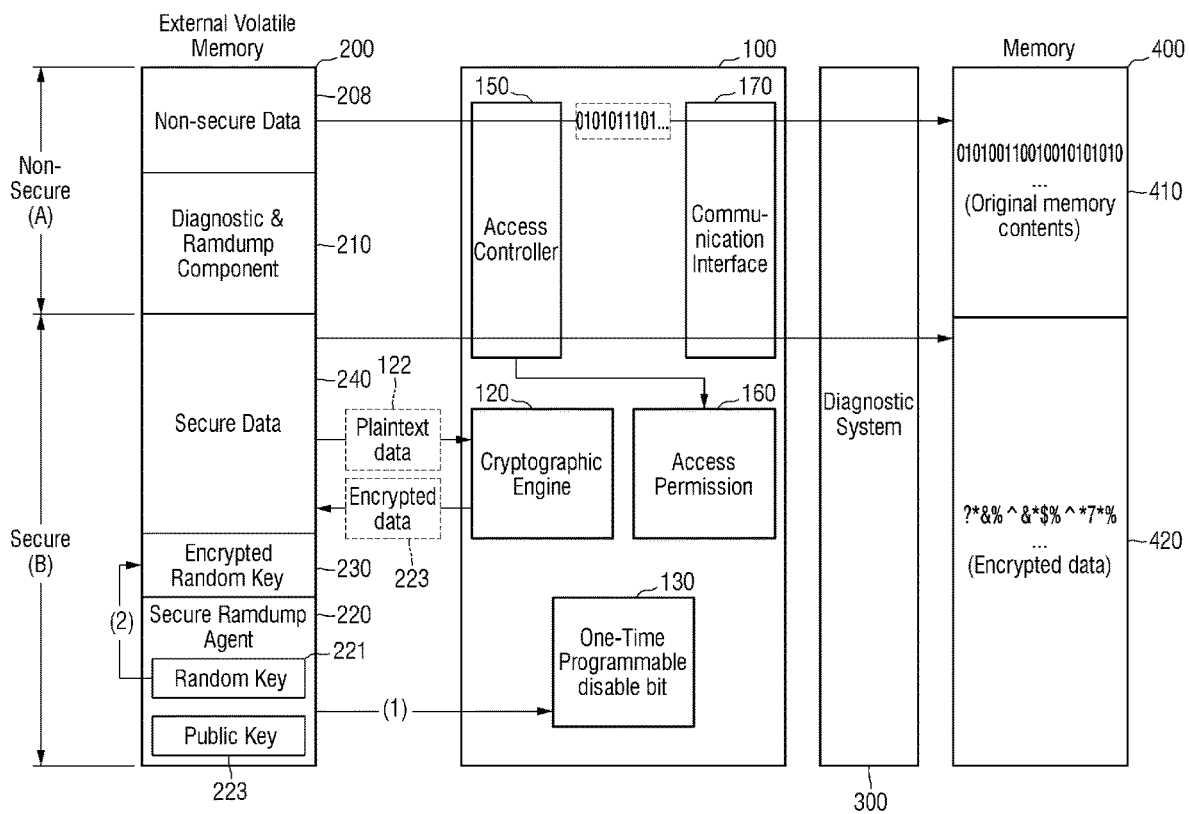
FIGS. 3A to 3D are diagrams illustrating an example of a method for operating a semiconductor device according to an example embodiment.

Referring to FIG. 3A, in operation (1), the secure ramdump agent 220 checks the OTP disable bit 130 at the time of booting the system or when loaded in the external memory 200.

In operation (2), the secure ramdump agent 220 generates the random key 221, encrypts the generated random key 221 and stores the encrypted random key 230 in the secure area B of the external memory 200. The public key 223 may be used to encrypt the generated random key 221.

Figure 3B:
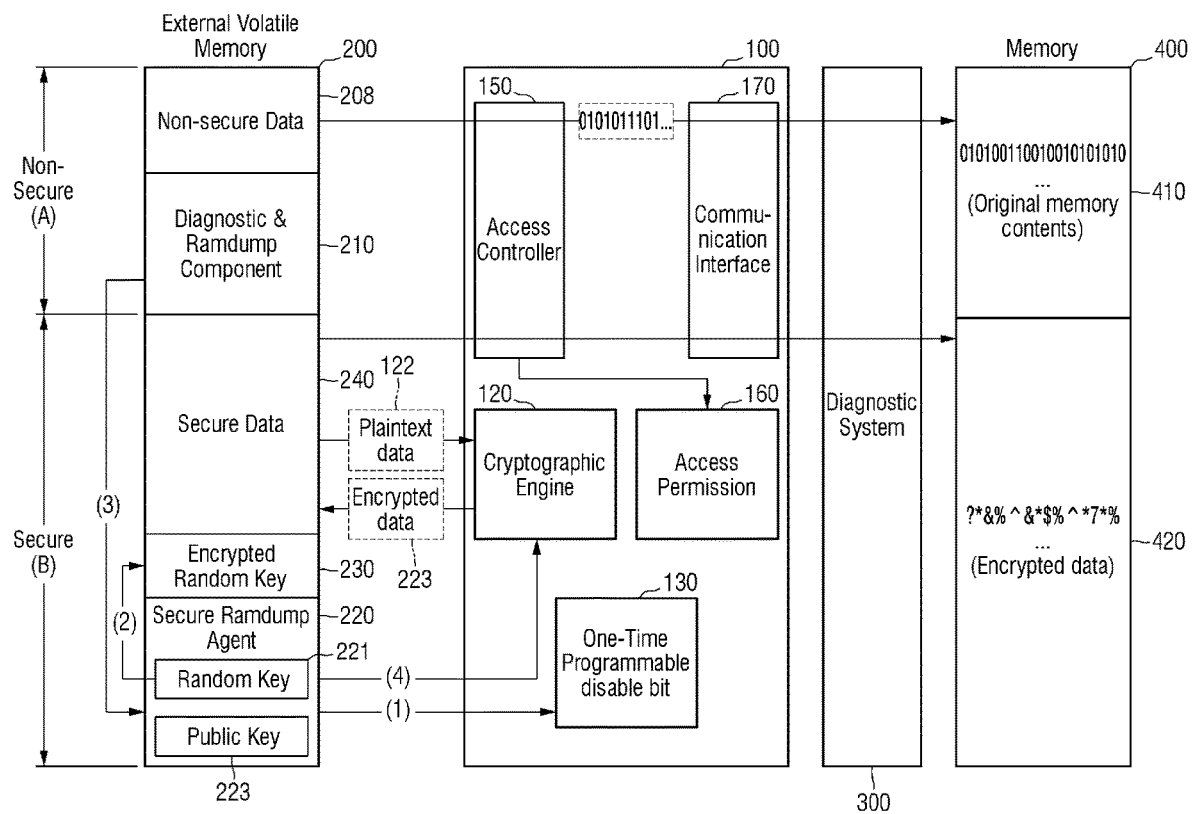

Referring to FIG. 3B, in operation (3), the diagnostic and ramdump component 210 notifies the secure ramdump agent 220 of the occurrence of a system failure and transmits a request to perform a ramdump on the external memory 200 to the secure ramdump agent 220.

However, as described above with reference to FIG. 2, the random key 221 may be generated in response to detecting the occurrence of a system failure, not at the time of booting the semiconductor system. That is, the random key 230 is newly generated at or after booting the semiconductor system, e.g., at the time of booting, or after detecting the occurrence of a system failure.

Accordingly, the secure ramdump agent 220 encrypts the secure data 240 stored in the secure area B by using the cryptographic engine 120, as in operation (4). Accordingly, plain text data 122 in the area of the secure data 240 may be converted into encrypted text data 123.

In addition, the secure ramdump agent 220 overwrites the encrypted secure data 250 at the same position as the position at which the secure data 240 has been stored.

Figure 3C:
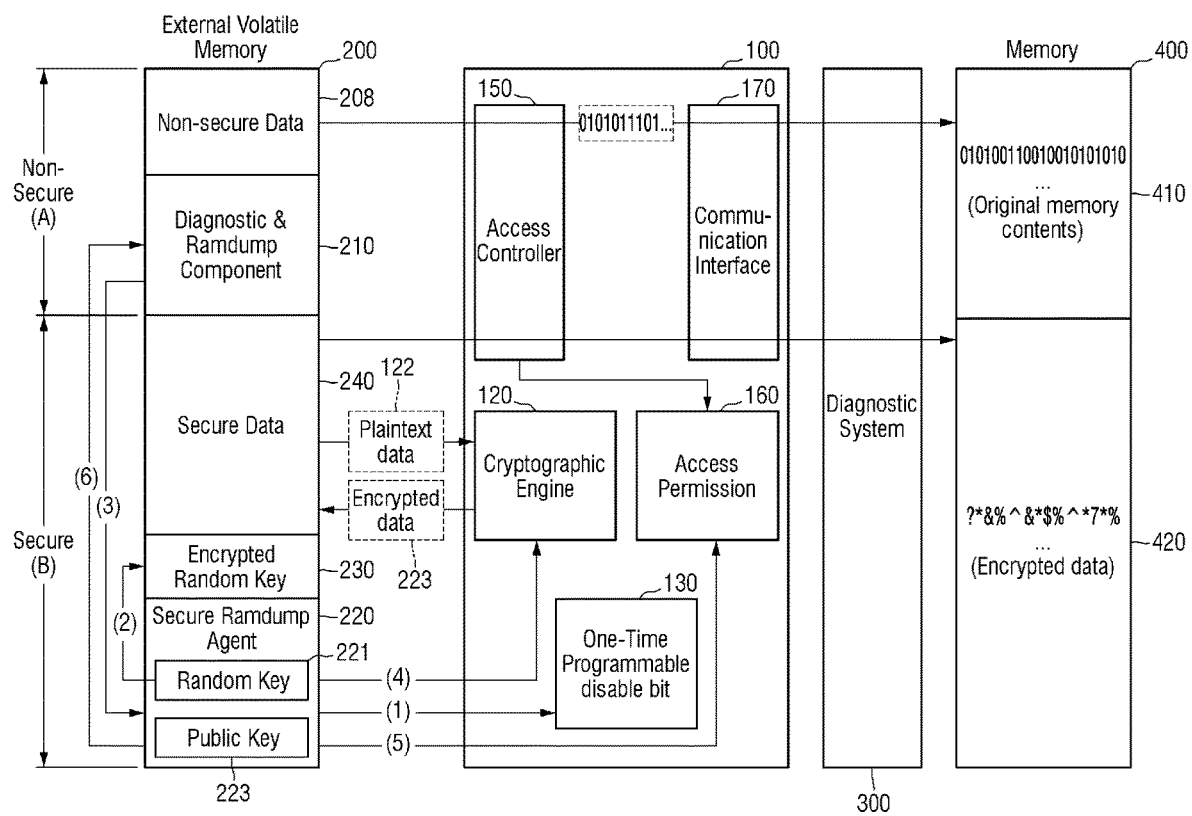

Referring to FIG. 3C, in operation (5), the secure area B of the external memory 200 is set as a non-secure area by using the access controller 150 and the access permission manager 160. Since a ramdump is performed on the non-secure area, the setting of the secure area B as the non-secure area allows a ramdump to be performed on the entire area, including the non-secure area A and the secure area B, of the external memory 200.

In operation (6), the secure ramdump agent 220 returns to the diagnostic and ram dump component 210.

Figure 3D:
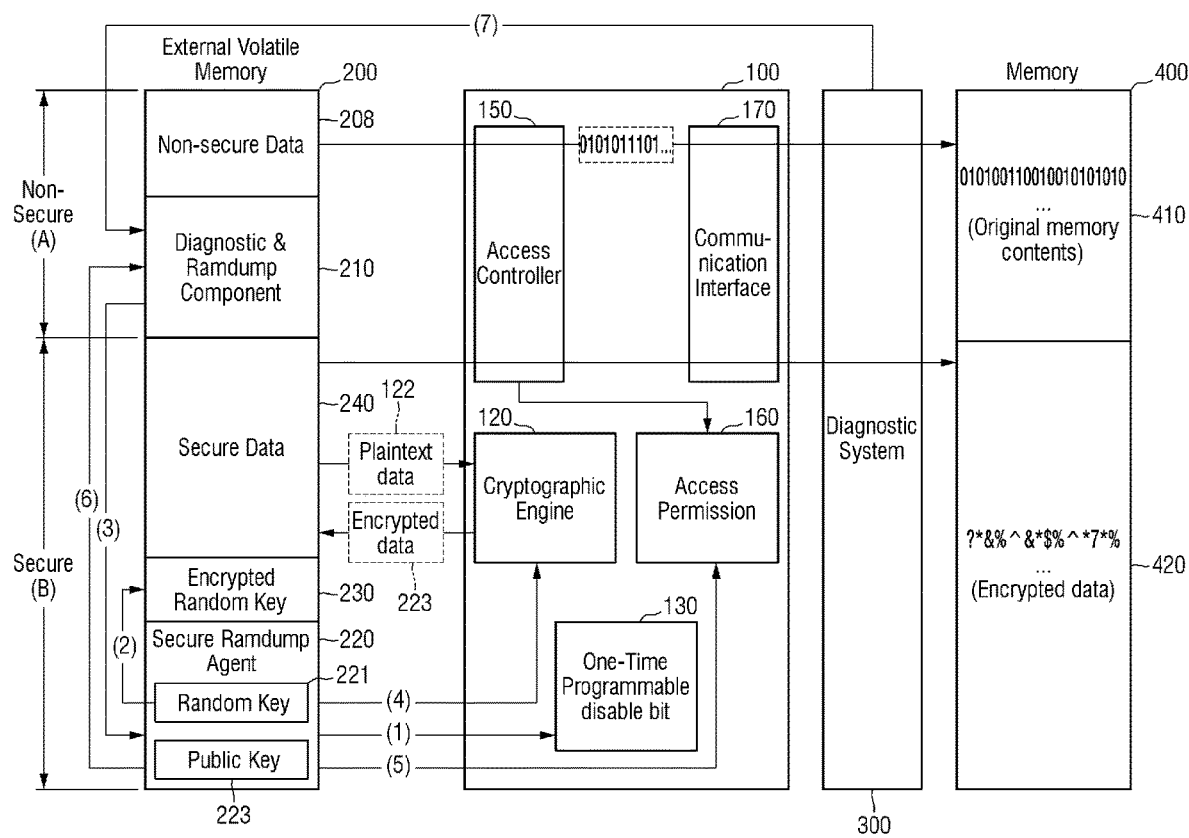

Referring to FIG. 3D, in operation (7), the diagnostic system 300 extracts the encrypted ramdump and performs the decryption.

The result extracted by the diagnostic system 300 is shown as a ramdump 400. The ramdump 400 includes a first area 410 corresponding to the non-secure area A of the external memory 200 and a second area 420 corresponding to the secure area B of the external memory 200. Although the contents of the first area 410 are immediately recognizable, the contents of the second area 420 are encrypted and cannot be immediately recognized. An authorized diagnostic system can decrypt the encrypted random key 230 using the private key 340 and decrypt the contents of the second area 420 using the decrypted random key 221.

According to an example embodiment, the secure data 240 is encrypted and the encrypted secure data 250 (refer to FIG. 5B) is overwritten at the same location on the external memory 200. Thus, there is no need for an additional storage space for storing the encrypted secure data 250. Further, when a system failure occurs, the data of not only the non-secure area A but also the secure area B may be securely dumped. In addition, since the secure data 240 is encrypted using the random key 221 newly generated at each boot time, the security level can be enhanced.

Figure 4:
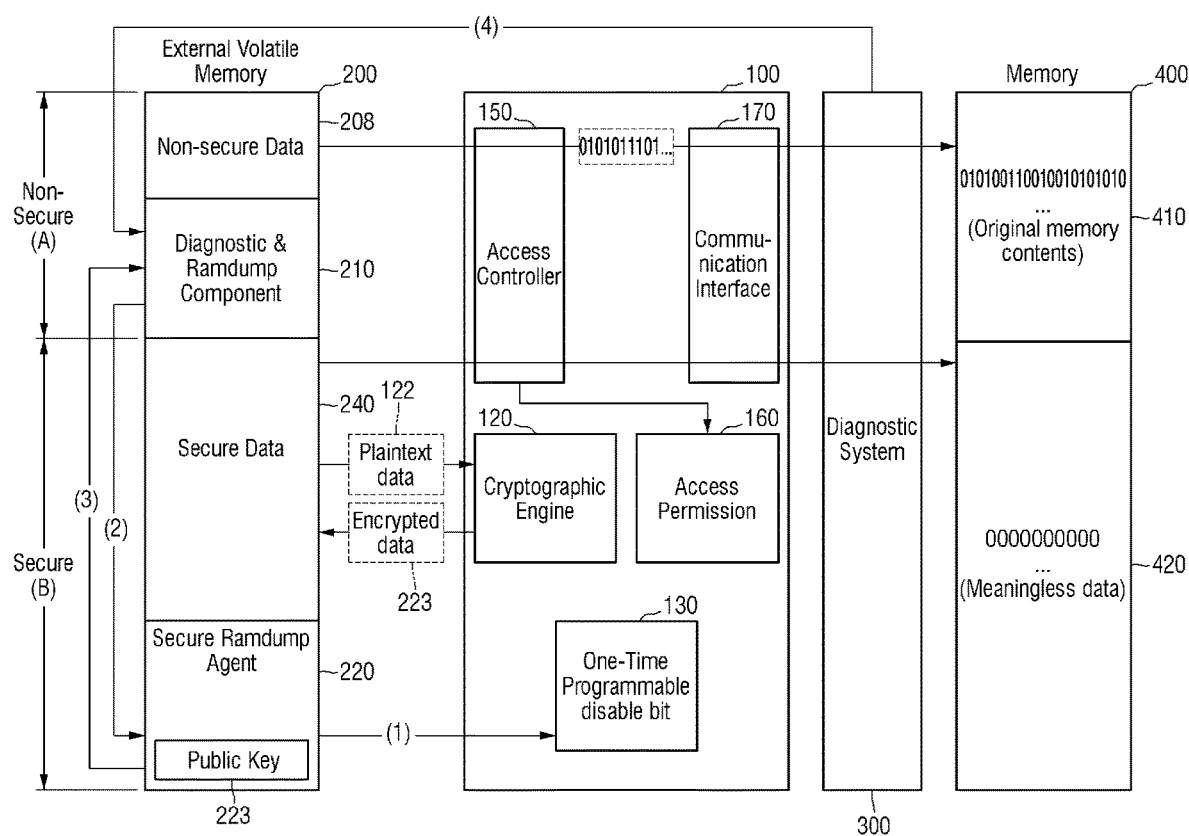
FIG. 4 is a diagram illustrating another example of a method for operating a semiconductor device according to an example embodiment.

FIG. 4 is a diagram illustrating another example of a method for operating a semiconductor device according to an example embodiment. FIG. 4 is based on the assumption that the OTP disable bit 130 is enabled, that is, a ramdump is prevented from being performed on the secure area B of the external memory 200.

Referring to FIG. 4, in operation (1), the secure ramdump agent 220 checks the OTP disable bit 130 at the time of booting the system or when loaded in the external memory 200.

Since the OTP disable bit 130 is enabled, the secure ramdump agent 220 does not generate the random key 221 and does not encrypt the secure data 240 stored in the secure area B.

In operation (2), the diagnostic and ramdump component 210 notifies the secure ramdump agent 220 of the occurrence of a system failure and transmits a request to perform a ramdump on the external memory 200 to the secure ramdump agent 220.

However, since the OTP disable bit 130 is enabled, the secure ramdump agent 220 does not perform a ramdump on the secure area B, and in operation (3), returns to the diagnostic and ramdump component 210.

Next, in operation (4), the diagnostic system 300 extracts the ramdump. In this case, the result extracted by the diagnostic system 300 is shown as the ramdump 400. The ramdump 400 includes the first area 410 corresponding to the non-secure area A of the external memory 200 and the second area 420 corresponding to the secure area B of the external memory 200. The contents of the first area 410 are immediately recognizable, but the contents of the second area 420 are filled with meaningless values, making it impossible to grasp the contents.

Accordingly, in a case where data of the secure area B is not to be dumped, it is possible to easily maintain the security of the secure area B by preventing the dump using the OTP disable bit 130.

FIGS. 5A to 5D are diagrams illustrating a change in a memory in the methods for operating a semiconductor device according to the example embodiments of FIG. 3A to FIG. 3D and FIG. 4.

Figure 5A:
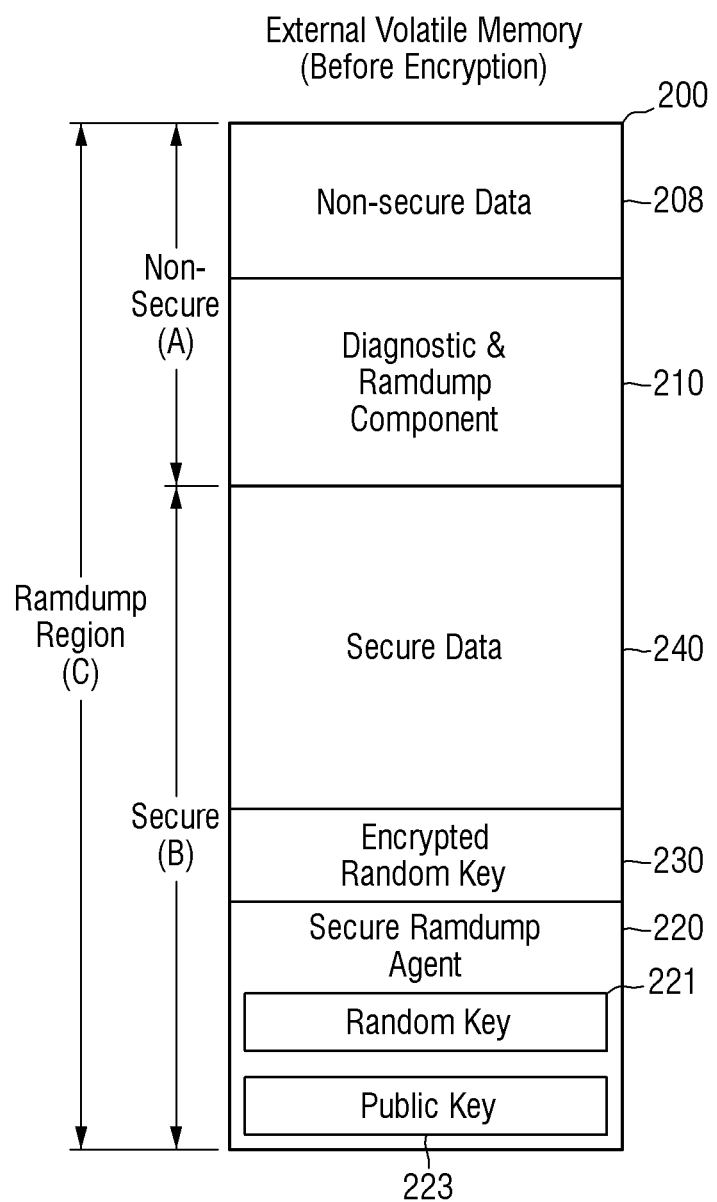
FIGS. 5A to 5D are diagrams illustrating a change in a memory in the methods for operating a semiconductor device according to the example embodiment of FIG. 3A to FIG. 3D and FIG. 4.
Figure 5B:
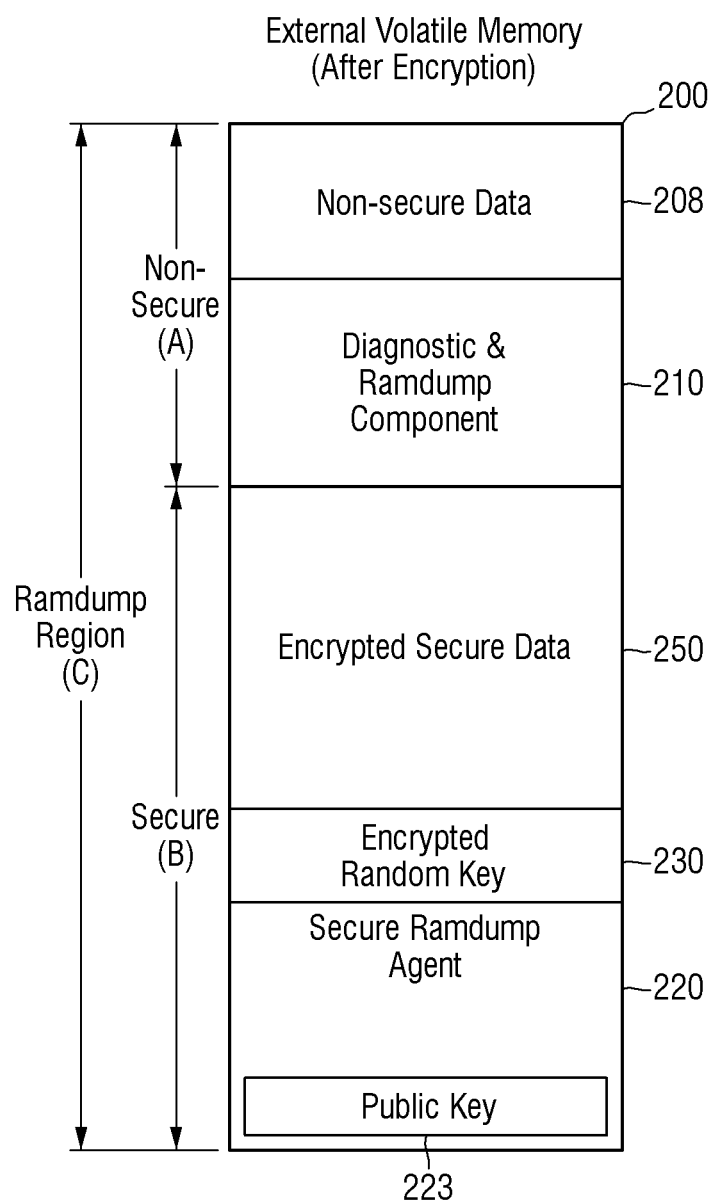

FIG. 5A shows a state of the external memory 200 before the secure ramdump agent 220 encrypts the secure data 240. FIG. 5B shows a state of the external memory 200 after the secure ramdump agent 220 encrypts the secure data 240.

Comparing FIGS. 5A and 5B, it can be seen that the random key 221 generated by the secure ramdump agent 220 is encrypted using the public key 223 generated in advance and stored as the encrypted random key 230 and the secure data 240 is encrypted by the random key 221 and stored as the encrypted secure data 250. In particular, it can be seen that the encrypted secure data 250 is overwritten at the same position as the position at which the secure data 240 has been stored.

Figure 5C:
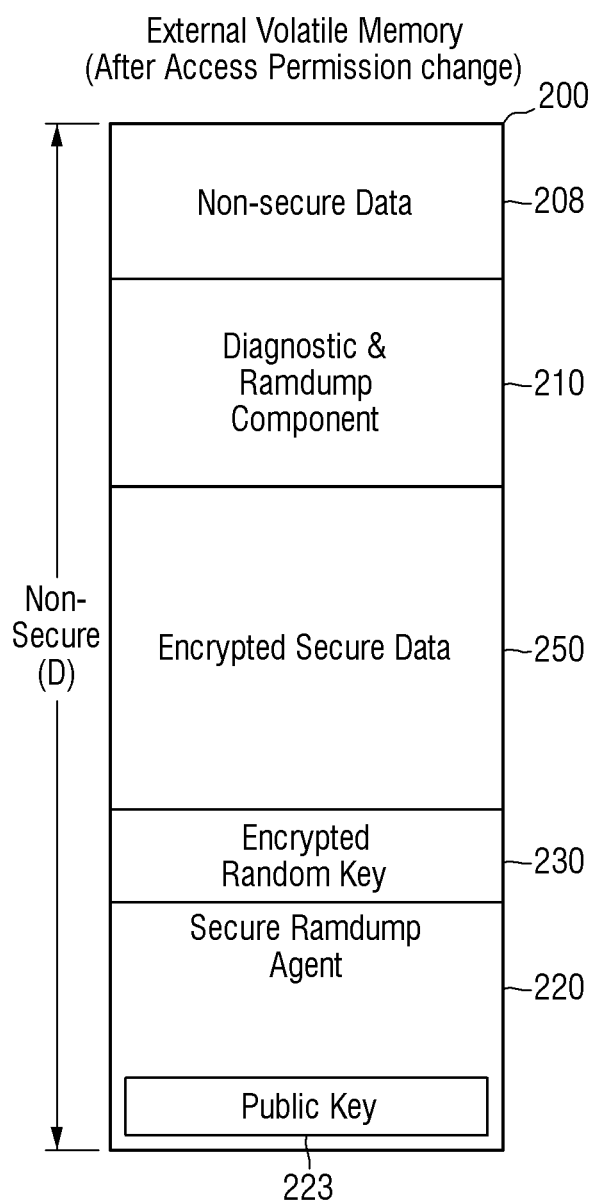

FIG. 5C shows that the secure ramdump agent 220 sets the secure area B of the external memory 200 as a non-secure area. Accordingly, it can be seen that the entire area of the external memory 200 becomes a new non-secure area D on which a ramdump may be performed. As described above with reference to FIG. 2, before the secure area B of the external memory 200 becomes the non-secure area D, the random key 221 stored in the external memory 200 is deleted such that the random key 221 is not exposed in a non-secure state.

Figure 5D:
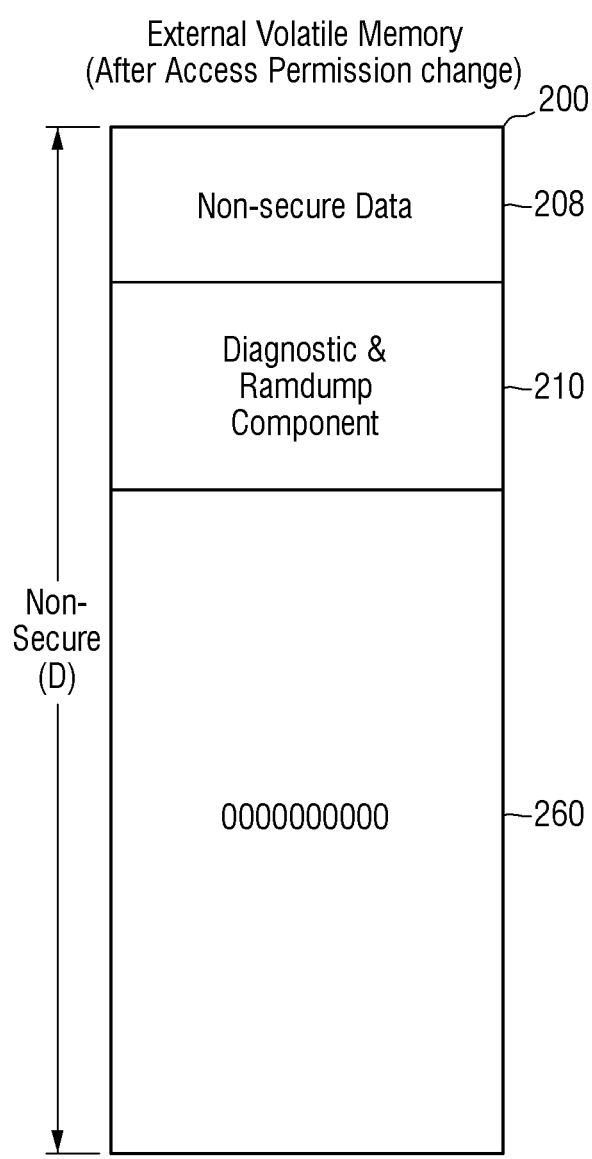

FIG. 5D shows a ramdump result when the OTP disable bit 130 is enabled, that is, when a ramdump is prevented from being performed on the secure area B of the external memory 200. The contents of areas 208 and 210 are immediately recognizable, but the contents of an area 260 are filled with meaningless values, making it impossible to grasp the contents.

Figure 6:
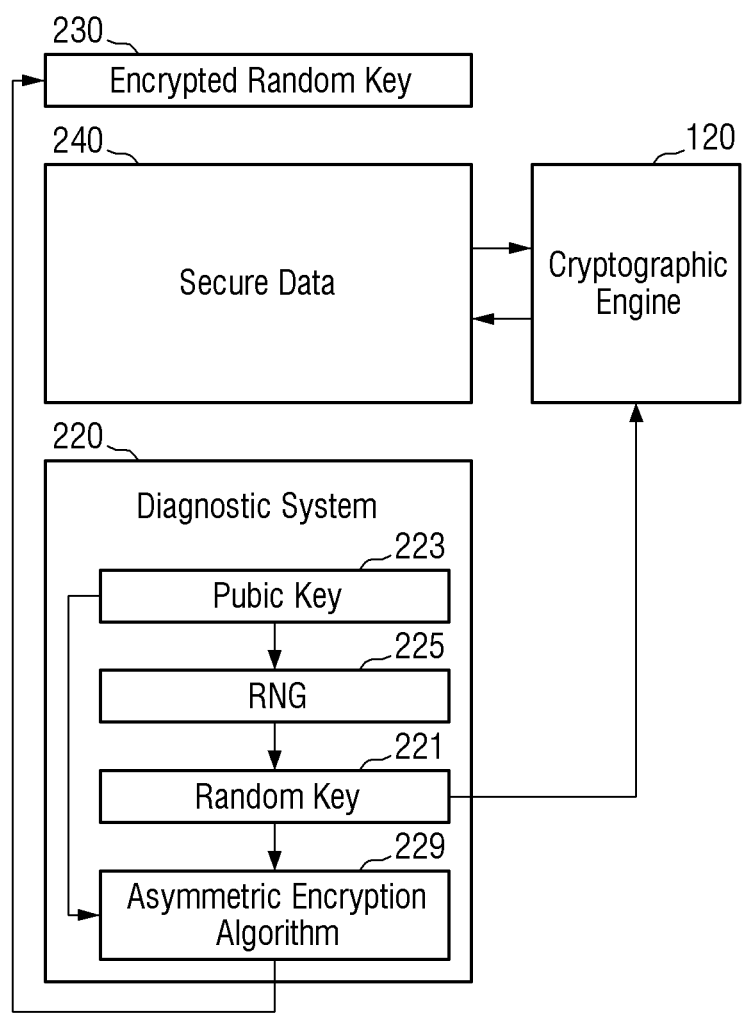
FIG. 6 is a diagram illustrating the encryption of the random key in a method for operating a semiconductor device according to an example embodiment.

FIG. 6 is a diagram illustrating the encryption of the random key in a method for operating a semiconductor device according to an example embodiment.

Referring to FIG. 6, the secure ramdump agent 220 generates the random key 221 using a random number generator 225 or the like, and generates an asymmetric encryption algorithm 229 using the public key 223 generated in advance to generate the encrypted random key 230.

Next, the secure ramdump agent 220 encrypts the secure data 240 through the cryptographic engine 120 using the random key 221.

Figure 7:
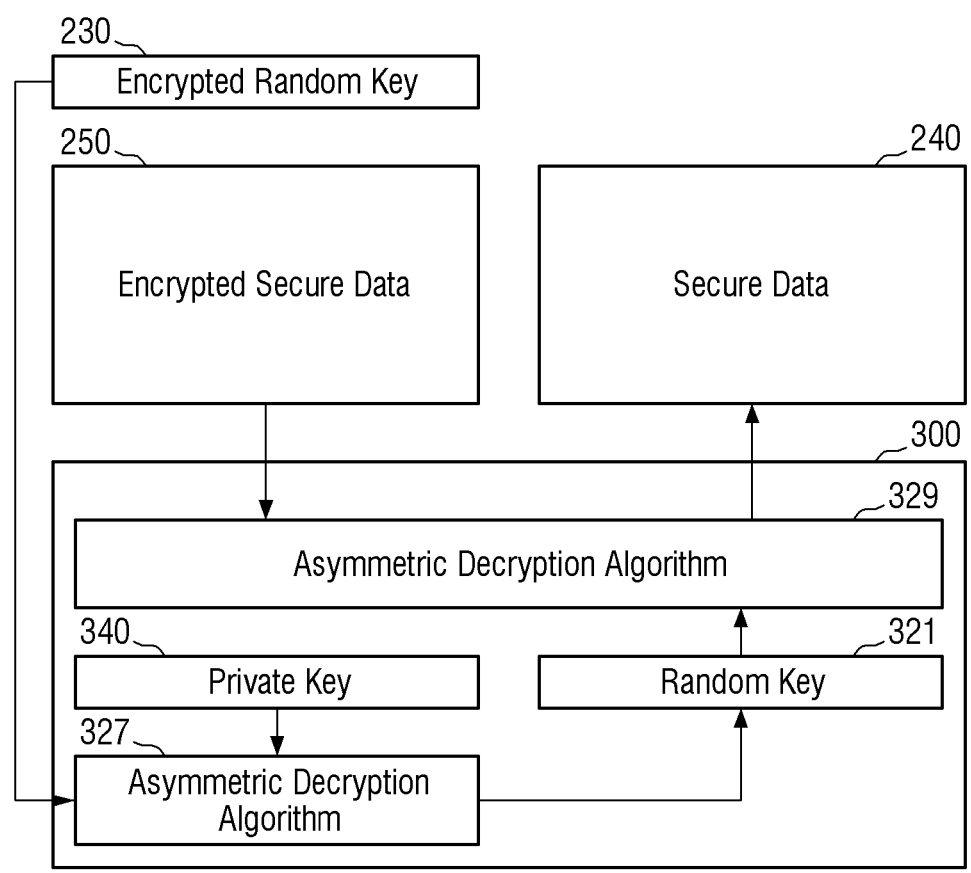
FIG. 7 is a diagram illustrating the decryption of the encrypted random key in a method for operating a semiconductor device according to an example embodiment.

FIG. 7 is a diagram illustrating the decryption of the encrypted random key in a method for operating a semiconductor device according to an example embodiment.

Referring to FIG. 7, the diagnostic system 300 decrypts the encrypted random key 230 through an asymmetric decryption algorithm 327 using the private key 340 in the key decryption unit 310 to obtain the random key 221, and decrypts the encrypted secure data 250 through an asymmetric decryption algorithm 329 using the random key 221 to obtain the secure data 240. The diagnostic system 300 may analyze the secure data 240 using the analysis tool 330 to determine the cause of the system failure.

Figure 8:
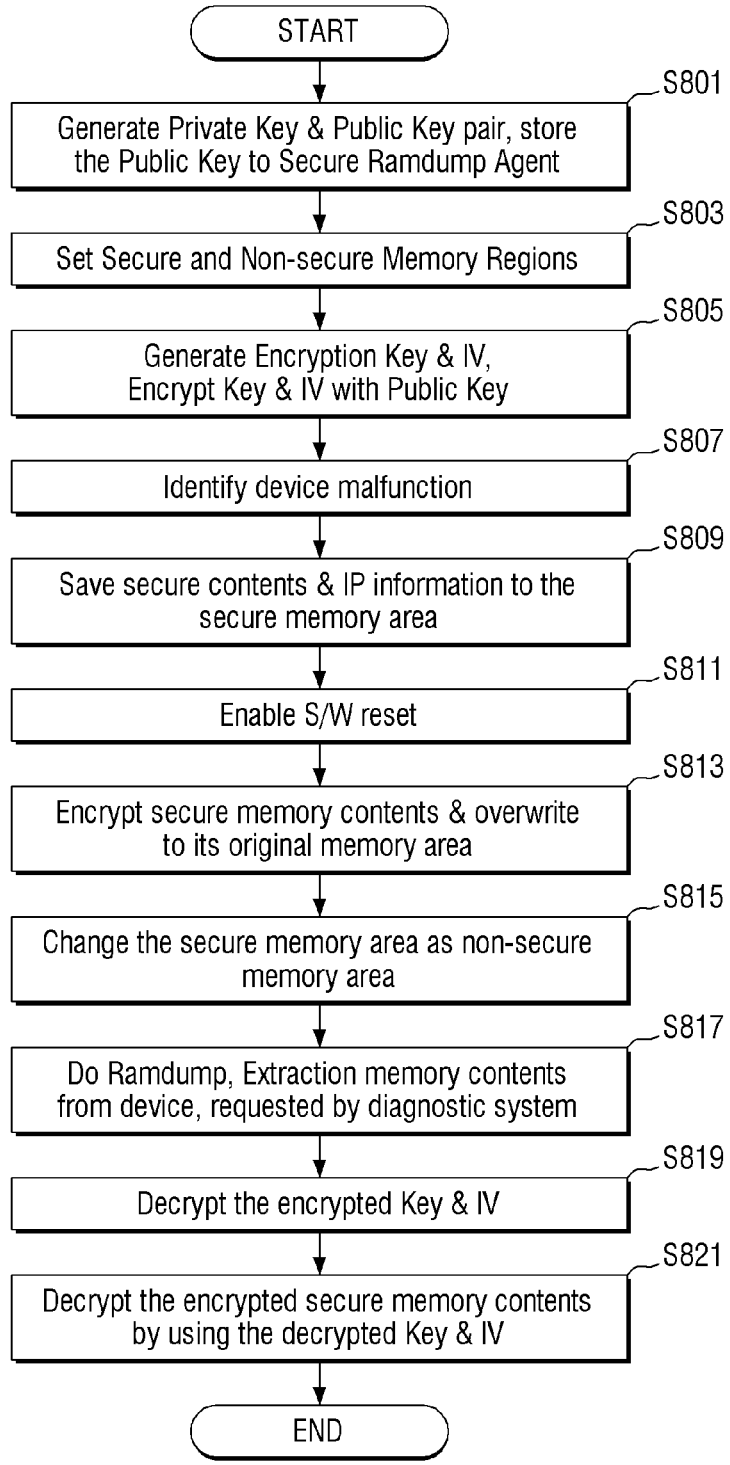
FIG. 8 is a flowchart illustrating a method for operating a semiconductor device according to an example embodiment.

FIG. 8 is a flowchart illustrating a method for operating a semiconductor device according to an example embodiment.

In operation S801, a pair of the private key 340 and the public key 223 is generated in advance, and the public key 223 is stored in the secure ramdump agent 220. The private key 340 may be held by the diagnostic system 300.

In operation S803, the secure area A and the non-secure area B are set on the external memory 200.

In operation S805, the secure ramdump agent 220 generates the random key 221. The random key 221 is used to encrypt the secure data 240 of the external memory 200.

The secure ramdump agent 220 encrypts the generated random key 221 and stores the encrypted random key 230 in the secure area B of the external memory 200. The encrypted random key 230 stored in the secure area B may be used to encrypt the secure data 240 of the external memory 200 in the event of a system failure in the future.

In some example embodiments, the secure ramdump agent 220 may encrypt the random key 221 using the public key 223 generated in advance in operation S801.

In some example embodiments, the secure ramdump agent 220 may newly generate the random key 221 each time the system is booted, thereby increasing the security level.

In operation S807, the diagnostic and ramdump component 210 monitors whether a system failure (e.g., device malfunction) has occurred. If the occurrence of a system failure is detected, the ramdump agent 220 of the occurrence diagnostic and ramdump component 210 notifies the secure of a system failure and transmits a request to perform a ramdump on the external memory 200 to the secure ramdump agent 220.

However, as described above with reference to FIG. 2, the random key 221 may be generated after detecting the occurrence of a system failure, not at the time of booting the semiconductor system. That is, the random key 230 is newly generated at or after booting the semiconductor system, e.g., at the time of booting, or after detecting the occurrence of a system failure.

In operation S809, the secure ramdump agent 220 stores the secure data 240 in the secure area B of the external memory 200.

In some example embodiments of the invention, storing the secure data 240 in the secure area B may further comprise storing hardware information in the secure area B.

Next, in operation S811, the secure ramdump agent 220 enables a software reset (S215). In operation S813, the secure data 240 stored in the secure area B is encrypted using the random key generated in operation S805, and the encrypted secure data 250 is stored again in the secure area B.

In some example embodiments, storing the encrypted secure data 250 in the secure area B may comprise overwriting the encrypted secure data 250 at the same position as the position at which the secure data 240 has been stored on the external memory 200.

Then, in operation S815, the secure ramdump agent 220 sets the secure area B of the external memory 200 as a non-secure area, so that a ramdump may be performed even on the original secure area B.

After the secure ramdump agent 220 returns to the diagnostic and ramdump component 210, the diagnostic system 300 sends a ramdump request to the diagnostic and ramdump component 210. In response to the ramdump request, the diagnostic and ramdump component 210 transmits the result obtained by dumping the data 208 corresponding to the non-secure area A and the encrypted secure data 250 corresponding to the secure area B to the diagnostic system 300 (operation S817).

Next, in the diagnostic system 300, the key decryption unit 310 decrypts the encrypted random key 230 using the private key 340 in operation S819, and the ramdump decryption unit 320 decrypts the encrypted secure data 250 using the decrypted random key 221 in operation S821. Accordingly, the diagnostic system 300 may analyze the information about the secure area B of the external memory 200 using the analysis tool 330 to determine the cause of the system failure.

According to the example embodiments, the secure data 240 is encrypted and the encrypted secure data 250 is overwritten at the same position on the external memory 200. Thus, there is no need for an additional storage space for storing the encrypted secure data 250. Further, in the event of a system failure, it is possible to dump the data of not only the non-secure area A but also the secure area B. If data of the secure area B is not to be dumped, it is possible to easily maintain the security of the secure area B by preventing the dump by using the OTP disable bit 130. In addition, since the secure data 240 is encrypted using the random key 221 newly generated at each boot time, the security level can be enhanced.

At least one of the components, elements, modules or units represented by a block as illustrated in the drawings may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

The "unit" used herein may be a hardware component such as a processor or a circuit, and/or a software component that is executed by a hardware component such as a processor.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A method of operating a semiconductor device, the method comprising:

in response to detecting a system failure, encrypting secure data stored in a secure area by using a random key newly generated after booting to generate encrypted secure data;
storing the encrypted secure data in the secure area; and
dumping the secure area and a non-secure area of a memory,
wherein the encrypting the secure data is performed in response to a one-time programmable (OTP) disable bit being disabled.

2. The method of claim 1, wherein the storing the encrypted secure data comprises:
overwriting the encrypted secure data at a position that is same as a position at which the secure data is stored on the memory.

3. The method of claim 1, wherein the dumping comprises:
after storing the encrypted secure data in the secure area, setting the secure area as the non-secure area; and
dumping an entire area of the memory.

4. The method of claim 1, further comprising, before detecting the system failure,
generating the random key; and
encrypting the random key by using a public key generated in advance and storing an encrypted random key in the secure area.

5. The method of claim 4, wherein the generating the random key comprises newly generating the random key at or after each system boot.

6. The method of claim 1, further comprising, after dumping the secure area and the non-secure area of the memory:
decrypting the encrypted secure data by using the random key.

7. The method of claim 6, wherein the decrypting comprises:
decrypting an encrypted random key by using a private key, and decrypting the encrypted secure data by using a decrypted random key.

8. A method of operating a semiconductor device, the method comprising:
checking a one-time programmable (OTP) disable bit in response to detecting a system failure;
in response to the OTP disable bit being disabled,
storing secure data in a secure area of a memory, the memory comprising the secure area and a non-secure area;
encrypting the secure data stored in the secure area by using a random key newly generated after booting to generate encrypted secure data;
storing the encrypted secure data in the secure area;
setting the secure area as the non-secure area; and
dumping the memory; and
in response to the OTP disable bit being enabled, maintaining the secure area of the memory and dumping the memory.

9. The method of claim 8, wherein the storing the encrypted secure data comprises:
overwriting the encrypted secure data at a position that is same as a position at which the secure data is stored on the memory.

10. The method of claim 8, further comprising, before detecting the system failure,
checking the OTP disable bit; and
in response to the OTP disable bit being disabled,
generating the random key; and
encrypting the random key by using a public key generated in advance and storing an encrypted random key in the secure area.

11. The method of claim 10, wherein the generating the random key comprises newly generating the random key at or after each system boot.

12. The method of claim 8, further comprising, after dumping the memory:
decrypting the encrypted secure data by using the random key.

13. The method of claim 12, wherein the decrypting comprises:
decrypting an encrypted random key by using a private key, and decrypting the encrypted secure data by using a decrypted random key.

14. A method of operating a semiconductor device, the method comprising:
loading a secure ramdump agent to a secure area of a memory, the memory comprising the secure area and a non-secure area;
loading a diagnostic and ramdump component to the non-secure area of the memory;
monitoring, by the diagnostic and ramdump component, whether a system failure is detected;
in response to detecting the system failure by the diagnostic and ramdump component, encrypting, by the secure ramdump agent, secure data stored in the secure area by using a random key newly generated after booting to generate encrypted secure data;
storing, by the secure ramdump agent, the encrypted secure data in the secure area;
setting, by the secure ramdump agent, the secure area as the non-secure area; and
dumping the memory,
wherein the encrypting the secure data is performed in response to a one-time programmable (OTP) disable bit being disabled.

15. The method of claim 14, wherein the storing the encrypted secure data comprises:
overwriting the encrypted secure data at a position that is same as a position at which the secure data is stored on the memory.

16. The method of claim 14, further comprising, by the secure ramdump agent,
newly generating the random key at or after a system boot; and
encrypting the random key by using a public key generated in advance and storing an encrypted random key in the secure area.

* * * * *